United States Patent
Hemmat et al.

(10) Patent No.: US 7,559,049 B1
(45) Date of Patent: Jul. 7, 2009

(54) INTEGRATED ADVANCE SCHEDULING OF INDETERMINATE PROJECTS IN AN INTEGRATED DEVELOPMENT PROCESS

(75) Inventors: Merzad Hemmat, Lenexa, KS (US); Bill G. Branch, Jr., Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 748 days.

(21) Appl. No.: 10/730,601

(22) Filed: Dec. 8, 2003

(51) Int. Cl.
G06F 9/44 (2006.01)
G06F 9/46 (2006.01)
G06Q 10/00 (2006.01)

(52) U.S. Cl. .................. 717/102; 717/103; 705/5; 705/8

(58) Field of Classification Search .......... 717/101, 717/100
See application file for complete search history.

(56) References Cited

U.S. PATENT DOCUMENTS

| | | | |
|---|---|---|---|
| 5,548,506 A | 8/1996 | Srinivasan | |
| 5,765,140 A | 6/1998 | Knudson et al. | |
| 7,051,036 B2 * | 5/2006 | Rosnow et al. | 707/102 |
| 7,139,999 B2 * | 11/2006 | Bowman-Amuah | 717/101 |
| 7,212,987 B2 | 5/2007 | Swanke et al. | |
| 2002/0042731 A1 | 4/2002 | King, Jr. et al. | |
| 2002/0059512 A1 | 5/2002 | Desjardins | |
| 2003/0018952 A1 * | 1/2003 | Roetzheim | 717/101 |
| 2003/0033191 A1 | 2/2003 | Davies et al. | |
| 2004/0143811 A1 * | 7/2004 | Kaelicke et al. | 717/101 |
| 2005/0114829 A1 * | 5/2005 | Robin et al. | 717/101 |
| 2006/0235732 A1 * | 10/2006 | Miller et al. | 705/7 |
| 2007/0276674 A1 | 11/2007 | Hemmat | |

OTHER PUBLICATIONS

"Enterprise Resource Planning (ERP) Project", University of Florida, Jan. 2003, pp. 1-25, Online retrieved at <www.bridges.ufl.edu/implementation/teams/processes/ERP-Project-Work-Policies-draft-v6.pdf>.*

Hemmat, et al., Provisional Patent Application entitled, "Enterprise Architecture Development Process," filed Aug. 19, 2002, U.S. Appl. No. 60/404,824.

Hemmat, Merzad, Patent Application entitled, "Method for Discovering Functional and System Requirements in an Integrated Development Process," filed Aug. 18, 2003, U.S. Appl. No. 10/643,334.

Issa, Philip, et al., Patent Application entitled, "EDP Portal Cross-Process Integrated View," filed Aug. 19, 2003, U.S. Appl. No. 10/643,417.

(Continued)

*Primary Examiner*—Tuan Q Dam
*Assistant Examiner*—Thuy Dao

(57) ABSTRACT

A method for scheduling software releases for a computer system. The method can consist of planning a series of releases for a given time period, each release having an initial allocation of capacity. Information regarding proposed software projects is reviewed and initial estimates of cost and duration for such projects are provided to customers for approval to move into detailed analysis. On receiving approval for each project, the planned series of releases and the initial estimate of cost and duration are reviewed and capacity is reserved in a release having available capacity. As detailed analyses and customer feedback change the scope of the projects approved for further analysis, the reserved capacity is adjusted and, where available capacity is not present, the reserved capacity is moved to a later release. As detailed analyses are completed and projects finally approved, the scheduled reservations are booked in the releases.

24 Claims, 2 Drawing Sheets

OTHER PUBLICATIONS

Brandes, Tracy, et al., Patent Application entitled, "Change Request Processing in an Enterprise Development Process," filed Aug. 19, 2003, U.S. Appl. No. 10/643,418.

Issa, Philip, et al., Patent Application entitled, "Integrated Software Implementation of Enterprise Development Process," filed Aug. 19, 2003, U.S. Appl. No. 10/643,419.

Hemmat, Merzad, et al., Patent Application entitled, "Enterprise Software Development Process for Outsourced Developers," filed May 27, 2004, U.S. Appl. No. 10/857,287.

Hindman, Leslie Shannon, et al., Patent Application entitled, "Tool and Method for Work Authorization in an Outsourced EDP Process," filed May 2, 2005, U.S. Appl. No. 11/120,224.

* cited by examiner

INTEGRATED ADVANCE SCHEDULING OF INDETERMINATE PROJECTS IN AN INTEGRATED DEVELOPMENT PROCESS

CROSS-REFERENCE TO RELATED APPLICATIONS

This application addresses subject matter related to U.S. patent application Ser. No. 10/429,615, filed May 5, 2003 and entitled "Defining and Sizing Feasible Approaches to Business Needs within an Integrated Development Process" and U.S. patent application Ser. No. 10/643,334, filed Aug. 18, 2003 and entitled "Method for Discovering Functional and System Requirements in an Integrated Development Process," both of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to the use of consistent checkpoints in the process of enterprise-wide software development to allow significant events to occur in a predictable, scheduled manner. More specifically, a method is provided for determining the appropriate size for a software release and for reserving the appropriate resources needed in an enterprise-wide software development project.

BACKGROUND OF THE INVENTION

Technologies that address the problem of integrating existing computer and communication systems with new systems in an organized, efficient, and economically scaleable manner can be referred to collectively as Enterprise Application Integration (EAI). The software engineering discipline that addresses EAI and the underlying integration issue is the domain of enterprise architecture. Architectural engineers typically realize architectures by specifying the components to be used (hardware, software, network, etc.); depicting how the components fit together (where and when in the process); clearly defining the interfaces and boundaries between components; setting guidelines and standards; and determining the layers, services, dependencies, and abstraction levels.

SUMMARY OF THE INVENTION

An embodiment of the invention is a method for scheduling resources to be used in a software development project. The method can comprise a customer providing information regarding a software development project to be completed. A planning department, which could be an Information Technology (IT) department or a release management group, initially reviews the provided information and provides initial feedback prior to completing a detailed requirements analysis. The detailed requirements analysis can include any or all of a functional requirements modeling step, a system requirements modeling step, an application integration modeling step, and a contract development step. The planning department reserves resources for the project based on the information prior to completing the detailed requirements analysis.

After reserving the resources and completing the detailed requirements analysis, the planning department can offer the customer a contract describing the resources to be used for the project and, upon approval of the contract by the customer, the planning department can schedule the reserved resources as agreed upon in the contract.

An alternative embodiment is a method for scheduling resources to be used in a software development project. The method can consist of a customer submitting information about the software development project to an IT department (which may be represented by a release management group). The IT department analyzes the feasibility of the project and estimates its cost. Based on the analysis of feasibility and estimate of cost, the customer decides whether to proceed with the project and, upon deciding to proceed, the customer prioritizes and funds a more detailed analysis for the project. At this point, the IT department reserves resources for the project. The IT department then models at least one set of requirements for the project. Upon completion of the requirements modeling, the IT department gives the customer an estimate of the resources needed for the project. Upon approval of the estimate by the customer, the IT department books the resources.

During the requirement modeling, the IT department can determine whether the results of the modeling of a requirement indicate that modifications to the requirement are needed. When modifications are needed, alerts can be sent to projects dependent on a project for which modifications are needed in the reserved resources, where the alerts inform the dependent projects that further analysis may be needed. The reserving of resources can be aided by a tool that uses past experience and the information submitted by the customer as input and produces an estimate of the resources required as output.

Another alternative embodiment is a method for scheduling software releases for a computer system. The method can consist of planning a series of releases for a given time period, each release having an initial allocation of capacity. Information regarding proposed software projects is reviewed and initial estimates of cost and duration for such projects are provided to customers for approval to move into detailed analysis. On receiving approval for detailed analysis for each project, the planned series of releases and the initial estimate of cost and duration for the approved project are reviewed and capacity is reserved in a release having available capacity for the project approved for further analysis. As detailed analyses and customer feedback change the scope of the projects approved for further analysis, the reserved capacity is adjusted and, where available capacity is not present, the reserved capacity is moved to a later release. As detailed analyses are completed and projects finally approved, the scheduled reservations are booked in the releases.

DETAILED DESCRIPTION OF THE PREFERRED EMBODIMENTS

Figure 1:
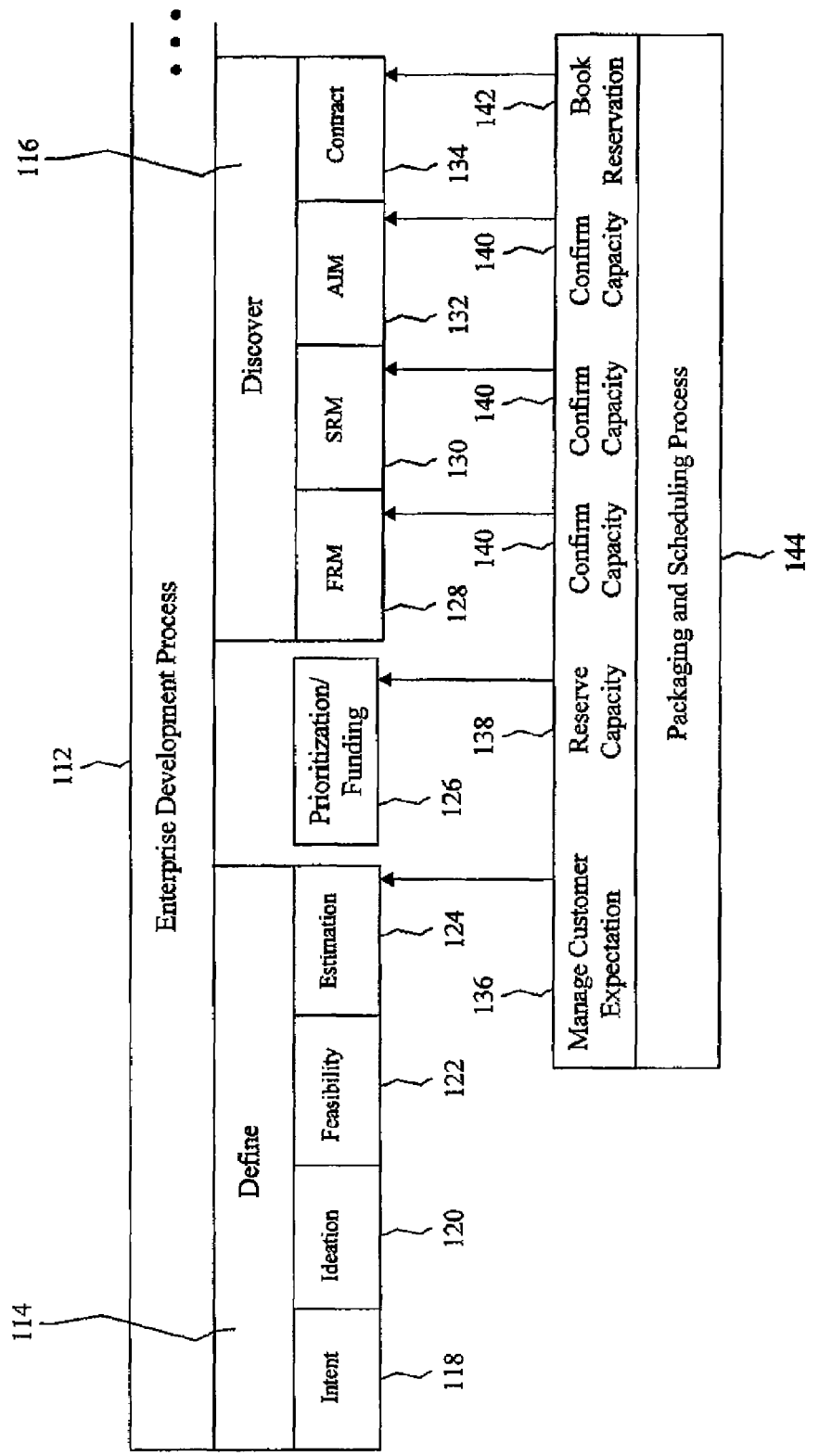
FIG. 1 is a block diagram depicting an embodiment of the packaging and scheduling process.

An enterprise-wide EAI process can be employed to facilitate the integration of enterprise architecture. A suitable process, known as the Enterprise Development Process (EDP), is described in detail in U.S. patent application Ser. No. 10/429, 615, filed May 5, 2003 and entitled "Defining and Sizing Feasible Approaches to Business Needs within an Integrated Development Process" and U.S. patent application Ser. No. 10/643,334, filed Aug. 18, 2003 and entitled "Method for Discovering Functional and System Requirements in an Integrated Development Process," both of which are incorporated herein by reference. EDP provides rigor to the process of enterprise-wide software development. Consistent checkpoints throughout the process allow significant events to occur in a predictable, scheduled manner. The EDP process typically comprises five phases: Define, Discover, Design, Develop, and Deploy. An optional sixth phase is a Demand phase that addresses feedback for long-term optimization.

The Define phase encompasses processes that define the business intent and concepts that are aligned with the business intent. Robust concept definition and ensuing communications ensure a proposed approach is on target with what a business wants delivered. Alignment with strategic network and information technology (IT) architectures is also facilitated. As a side benefit, the Define phase can reduce estimation time averages.

The Define phase typically comprises four steps, Intent, Ideation, Feasibility, and Estimation. Intent refers to processes that help define the business's strategic intent through the integration of mission, goal, objective, and capability models. Business-related decisions are made at this point without consideration of feasibility or design. Ideation encompasses formal and informal idea generation and the rigor of idea selection via validation against strategic intent. In the Ideation step a problem is defined in the context of Intent and a technical approach to the problem is developed. Intent and Ideation are specific to a particular business unit. The Feasibility step facilitates determination of technical approaches, test approaches, critical functional impacts, impacted systems, and overall feasibility of concepts prior to Estimation. The Estimation step facilitates estimation of level of effort to aid with prioritization and investment decisions. An appropriate capacity of personnel, hardware, and other resources as needed to complete a project is estimated.

The Discover phase refers to the processes that help discover functional and system requirements in support of business requirements. The Discover phase facilitates a "process-driven" approach to requirements gathering. The analysis conducted in the Discover phase verifies the business processes envisioned and elicits all the requirements of the project. These requirements are documented in a centralized repository along with the business and system process models, thus enabling traceability and reuse on subsequent projects. As a by-product of the Discover phase analysis, it is possible to automatically generate interfaces as well as test workflows and test cases. These automation capabilities shorten the test window and overall project cycle time.

The Discover phase typically comprises four steps, Functional Requirements Modeling (FRM), System Requirements Modeling (SRM), Application Integration Modeling (AIM), and a Contract Development Procedure. FRM facilitates identification of functional requirements, linked to supporting business requirements.

Automated solutions can begin to be sought in the SRM step. SRM facilitates identification of system requirements, linked to supporting functional requirements. In this step, IT personnel can provide packages of options for approaching a problem and business-oriented personnel can choose an appropriate option.

AIM bridges the complexities of application, messaging, and information components into an integrated architecture that supports development, implementation, and maintenance of a flexible and robust IT infrastructure. AIM provides rigorous processes, methodologies, and tools to document and validate interfaces between enterprise applications and to support software development that involves application integration using brokers and middleware components. AIM also helps application programmers understand their responsibilities within functional and process areas.

The Contract Development Procedure specifies the steps, timing, and approvals needed to produce a valid contract for a project. A standard project contract describing a proposed project (also referred to as a concept) is typically created as a result of the Contract Development Procedure.

The Define and Discover phases are the portions of EDP in which a software development project moves from a concept to a well-defined project. At the end of the Discover phase, an agreement is reached between a customer and an IT group regarding the personnel, computing equipment, and other resources that will be dedicated to a project. As used herein, the term "customer" can refer to a business unit within an enterprise to which an IT department within the enterprise is providing services.

Multiple software projects are typically bundled in releases, where a release can be defined as a standard, periodically released package that can accommodate software projects of varying sizes and complexities. A release typically has a defined a number of hours of labor capacity as well as other resource capacity. A defined number of releases are typically completed in a year and are typically spread throughout a year. Releases can be defined as either major or minor, where a major release has a larger labor capacity and uses more computing resources compared to a minor release. As an example, an enterprise might schedule five major releases with 100,000 hours of capacity each and four minor releases with 50,000 hours of capacity each, to be completed at predefined intervals throughout the year.

Testing of the software in a software project is typically done before a release is released. Testing is generally done in computing labs and can be limited by the equipment available in the labs. For example, if the equipment in the labs can accommodate only five projects at a time that use a frame relay service, then no more than five such projects can be packaged in a release.

Software projects are typically placed into releases based on the number of hours estimated to be needed to complete the project, the desired completion date for the project, and the availability of personnel, lab equipment, and other resources in the upcoming releases. Traditionally, a software project was targeted for a particular release only when all of the requirements and costs for the project were definitively determined. That is, cross-organizational impact analysis, scheduling, and packaging of projects into releases did not occur until an analysis phase was complete and the requirements and costs of the project were signed off. This analysis phase can be viewed as being roughly equivalent to the Discover phase in EDP. When the analysis phase was complete, the appropriate resources, such as personnel and computing equipment, would be committed for the project based on the complexity of the project. At this late stage in the process, circumstances may have changed and any of the required resources may not be available and hence a project might have to be rescheduled, redesigned, rescoped, or abandoned, hence introducing an adverse impact on the business.

The packaging and scheduling of releases can be made more efficient and effective by establishing a process to reserve capacity in standard releases earlier in the development life cycle. The present disclosure reserves resources and capacity in standard releases at a point in the project development lifecycle prior to the point when requirements are definitively set. This allows better management of a customer's expectations on delivery times for software projects. It also allows adjustments to be made to projects and/or schedules during the evaluation, analysis, and requirements setting phases of project development. This can prevent the unanticipated adverse impact on project scope, cost, and/or schedule.

In one embodiment, a planning department receives estimates from its customers of the time required for proposed projects in the next year. More specifically, the projects may be software development projects and the planning department may be an IT department, where the term "IT department" can refer to any organization within an enterprise responsible for system planning of projects. Sub-groups of the planning department may include release management groups acting under the overall planning department (or in one embodiment acting under the IT department). For the purposes of this disclosure, where the "planning department's" activities are discussed, this could also include the release management group(s)' activities where the release management group is a sub-group of the planning department. Regardless of the particular title these groups or departments hold within an organization, the basic function they accomplish and roles they play reasonably apply and would be understood by those of skill in the art. The IT department adds the estimates from all of its customers to get a total amount of work for the year. Those hours are then divided into releases throughout the year. The number and capacity of the releases is determined by the total number of hours and available resources. For contingency, an extra percentage can be added to the hours allocated to each release.

As projects approach and/or enter the pipeline, they are then assigned to the different releases based on certain reservation criteria such as the projected development cycle, the preliminary test approach as determined in the Feasibility step, the level of effort determined in the Estimation step, network and IT architecture, the type of platform required, the type of lab required, the available resources in the required lab, dependencies with other projects, the available capacity in the target release, and the available workforce in the required areas.

The release management system can be integrated with EDP at several points in the scheduling process, as illustrated in the embodiment of FIG. 1. Only the Define 114 and Discover 116 phases of the EDP process 112 are shown; the Design, Develop, and Deploy phases are not shown. As discussed previously, the Define phase 114 comprises Intent 118, Ideation 120, Feasibility 122, and Estimation 124. The Discover phase 116 comprises FRM 128, SRM 130, AIM 132, and Contract Development 134.

In the Feasibility step 122, a customer provides information regarding a proposed project (a concept) to an IT department. The information might include the customer's estimates of the labor hours needed, the computing equipment needed, and other relevant parameters. The customer also typically provides a target date for completion of the proposed project. The IT department then assesses the information provided by the customer and determines if the customer's expected delivery date for the proposed project is feasible. If the date is deemed infeasible, the customer may either revise or abandon the proposed project. If the date is considered feasible, the process moves to the Estimation step 124.

In the Estimation step 124, the IT department manages the customer's expectations 136 by looking at the estimated project costs, the estimated level of effort, and the typical project duration, and giving the customer an estimate, based on past experience, of the likely duration of the proposed project. The IT department then tries to estimate which release(s) the proposed project will be placed in. In some embodiments, a fixed estimated completion date is not given since the start date may not be known.

Between the Define 114 and Discover 116 phases, a prioritization and funding step 126 can occur. This step is not part of EDP 112 but is a process performed by the customer in which the customer considers the information provided by the IT department in the Define phase 114. At this point the customer can decide whether to fund further analysis of a proposed project, re-scope the proposed project by sending it back to the Define phase 114 for revision under a modified scope or conditions, or cancel the proposed project. If further analysis is approved, the proposed project (or concept) becomes an actual project (hereinafter referred to as simply a "project") and the customer prioritizes and funds the project. The IT group can then reserve capacity 138 and a target schedule implementation for the project in the appropriate release.

In the illustrated embodiment, the reservation is confirmed at the end of each step in the Discover phase 116. The confirmations 140 ensure that the reservation criteria for placing the project in the release, such as available lab resources and available capacity in the release, are still being met. At each point where the reservation is confirmed, the progress of the entire project can be reviewed in addition to the review of the impact of changes that occurred in that module. If discrepancies are found between the estimates and the actual progress of the project, the appropriate actions can be taken, such as revising the estimate, sending the project back to the Define phase 114, changing the number of personnel assigned to the project, or using different test equipment. In alternative embodiments with a more generic analysis phase, confirmation checks during analysis may occur at logical breakpoints in the analysis process, at specific timed intervals (e.g., weekly, monthly, etc.), or not at all.

At the end of the Discover phase 116, the IT department gives the customer a revised refined estimate of the resources needed for the project along with, in some embodiments, a proposed schedule for the project and then offers the customer a final contract. If the customer approves the contract, the reservation is booked 142 and resources are committed. This means that the schedule is set, capacity in the release is locked, and a formal change request must be submitted to make any changes. In some embodiments, a penalty must be paid to make any changes, either directly in slipping the release date or in additional overtime assessment, or indirectly through the adverse impacts on the company of wasted efforts prior to the change request.

The managing of customer expectations 136, the reserving of capacity 138, the confirming of capacity 140, and the booking of reservations 142 collectively comprise one embodiment of the packaging and scheduling process 144.

Figure 2:
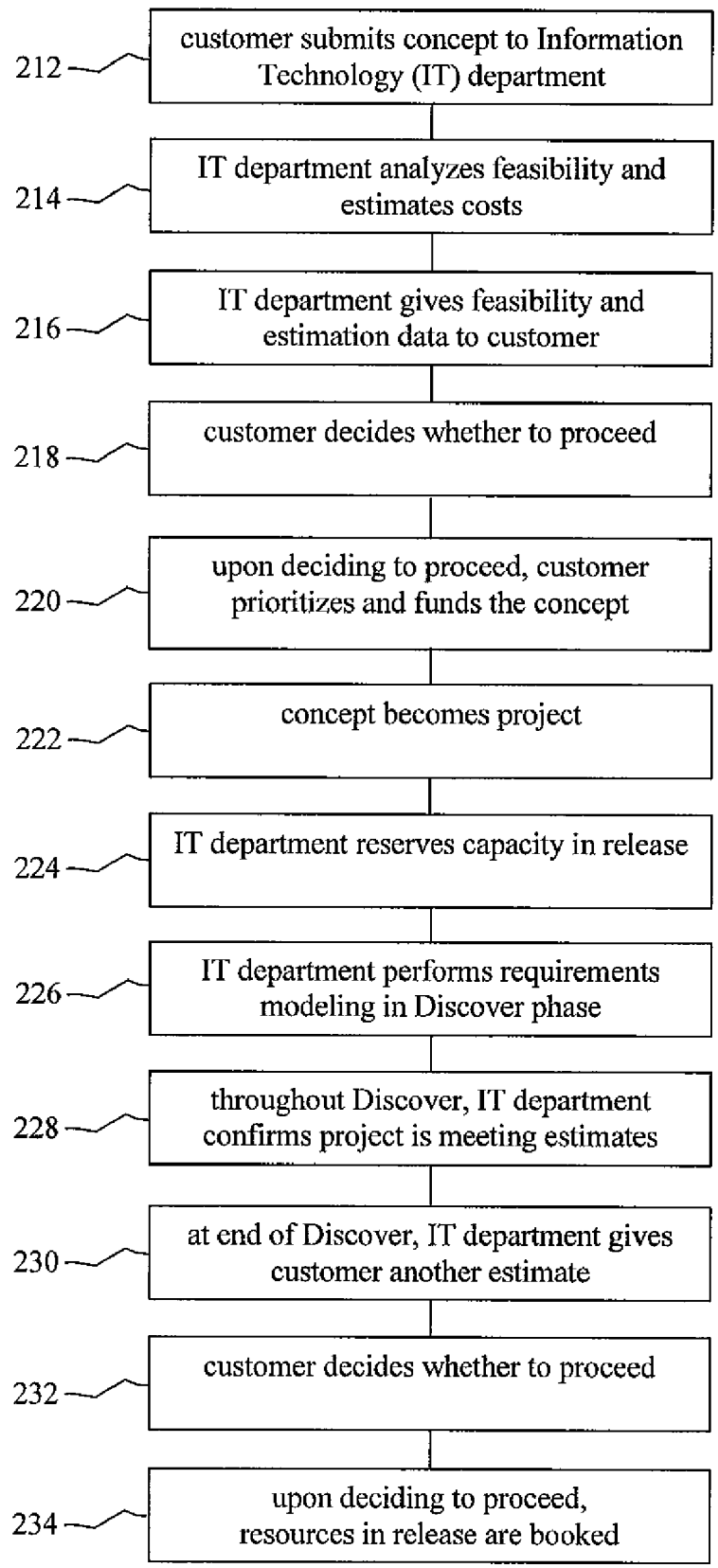
FIG. 2 is a flowchart depicting an embodiment of the packaging and scheduling process.

A flowchart depicting steps that might be taken in an embodiment of the scheduling process is shown in FIG. 2. In box 212, a customer submits a concept for a software development project to an IT group. In box 214, the IT group analyses the feasibility of the concept and estimates its cost. The IT group gives the feasibility and estimation data to the customer in box 216. In box 218, the customer decides whether or not to proceed with the concept. Upon deciding to proceed, the customer prioritizes and funds the concept in box 220. The concept then becomes a project in box 222. In box 224, the IT group reserves capacity in an appropriate release. In box 226, the IT group performs requirements modeling in the Discover phase of EDP. In box 228, throughout the Discover phase, the IT group confirms that the project is meeting its estimates. At the end of the Discover phase, the IT group gives the customer an updated estimate in box 230. In box 232, the customer decides whether or not to proceed with the project. If the customer decides to proceed, the appropriate resources are booked in the appropriate release in box 234.

When a project is validated against the reservation criteria throughout the Discover phase, it can be found that the project no longer meets its reservation criteria. For example, the number of labor hours needed on the project may exceed the estimate. In this case, the project might slip out of its release. Also, if there is a change of scope during Discover, the project might have to be moved and may slip to a different release. If a project slips, it can move to the next available and appropriate release unless compelling business reasons mandate an exception handling process. Extra capacity in a release resulting from a project slipping from that release can be used for exception handling or to move other projects into the release.

As an alternative to a project slipping, the project's sponsor can request a change to the release capacity threshold. A request to change the release capacity threshold typically must be accompanied by compelling business reasons supported by the executive management of the sponsoring unit and, in some embodiments, by the IT department. Changes to the release capacity threshold are typically considered on a case-by-case basis and approved by executive management or by a committee they designate.

The projects packaged in a release can have dependencies on other projects in the release. That is, a first project may need to be completed successfully in order for a second project to be completed successfully. If the first project slips from its release, the requirements for the second project might need to change in order for the second project to avoid failure. In an embodiment of the disclosure, when a project slips, all projects dependent on that project are sent alerts informing them that their requirements may have changed.

As described above, the process of assigning projects to releases can be based on several reservation criteria such as the estimated level of effort, the availability of personnel, and the availability of lab equipment. A tool such as a spreadsheet or an expert system can be used to facilitate this process. Experience gained from observing the ultimate size of projects having particular characteristics can be made available to the tool. When an estimate of the likely size of a new project is to be made, the known characteristics of the project can be entered into the tool. The tool then compares those characteristics with the characteristics of similar past projects and, based on experience from those projects, provides an estimate of the resources needed for the new project. With the developed information, some embodiments of the tool can also then generate a schedule for the projects and releases.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A computer implemented method for scheduling resources to be used in a software development project comprising:

a planning department receiving information from a customer regarding a software development project to be completed through define, discover, design, develop, and deploy phases, the software development project is one of a plurality of software development projects bundled in a release, wherein the release has a predefined resource capacity;

the planning department initially reviewing the received information and providing initial feedback in the define phase prior to completing a detailed requirements analysis in the discover phase, wherein the discover phase is in support of business requirements which are documented in a centralized repository and enable traceability and reuse in subsequent projects, and wherein the detailed requirements analysis includes a plurality of steps including one or more of functional requirements modeling, system requirements modeling, and application integration modeling;

the planning department reserving resources for the software development project from the predefined resource capacity for the release via a software tool that uses past experience and the information received from the customer as input and produces an estimate of resources required for the software development project as output prior to completing the detailed requirements analysis, wherein reserving resources reduces availability of the predefined resource capacity in the release for subsequent software development projects;

the planning department confirming the reserved resources at each of the plurality of steps in the detailed requirements analysis;

the planning department offering the customer a final contract upon completion of the plurality of steps of the detailed requirement analysis, wherein the final contract describes the resources to be used for completion of the project; and the planning department storing a list of the reserved resources on a computer readable medium.

2. The method of claim 1, further comprising after reserving resources:

scheduling the reserved resources as agreed upon in the contract upon approval of the contract by the customer through the planning department.

3. The method of claim 2, wherein one of the plurality of steps of the detailed requirements analysis comprises:

a functional requirements modeling step.

4. The method of claim 2, wherein one of the plurality of steps of the detailed requirements analysis comprises:

a system requirements modeling step.

5. The method of claim 2, wherein one of the plurality of steps of the detailed requirements analysis comprises:

an application integration modeling step.

6. The method of claim 2, wherein one of the plurality of steps of the detailed requirements analysis comprises:

a contract development step.

7. The method of claim 1, further comprising:

reserving resources for a second software development project subsequent to reserving resources for the software development project and prior to completing the detailed requirements analysis for the second software development project, wherein the resources for the second software development project are reserved from a predefined resource capacity for a second release subsequent to the release based on the release not having sufficient available resource capacity for the second software development project.

8. The method of claim 1, further comprising:
a customer providing second information regarding a second software development project to be completed through define, discover, design, develop, and deploy phases;
a planning department initially reviewing the provided second information and providing initial feedback in the define phase prior to completing the detailed requirements analysis in the discover phase;
the planning department reserving resources for the second software development project from a predefined resource capacity for a second release based on the second information prior to completing the detailed requirements analysis for the second software development project and based on the release not having sufficient available resource capacity for the second software development project due to the reservation of the resources for the software development project in the release.

9. A computer implemented method for scheduling resources needed for a project to be completed through define, discover, design, develop, and deploy phases, comprising:
a planning department managing a customer's expectations about the project based on preliminary information the customer provides to the planning department, wherein the project is one of a plurality of projects bundled in a release, wherein the release has a predefined resource capacity;
the planning department receiving approval of the project from the customer, in the define phase, for further analysis in the discover phase, wherein the discover phase is in support of business requirements which are documented in a centralized repository and enable traceability and reuse in subsequent projects, and wherein the further analysis includes a plurality of steps including one or more of functional requirements modeling, system requirements, and application integration modeling;
the planning department reserving resources for the project from the predefined resource capacity for the release, wherein the reserving of resources is aided by a software tool that uses past experience and the preliminary information as input and produces an estimate of the resources required as output, wherein reserving resources reduces availability of the predefined resource capacity in the release for subsequent projects;
the planning department confirming the reserved resources at the end of at least one of the plurality of steps in the further analysis;
upon completion of the plurality of steps in the further analysis, the planning department offering the customer a final contract describing resources to be used for completion of the project;
upon approval of the contract by the customer, the planning department scheduling the reserved resources as agreed upon in the final contract; and
the planning department storing a list of the reserved resources on a computer readable medium.

10. The method of claim 8 wherein the managing of the customer's expectations comprises the planning department giving the customer an estimate of the likely duration of the project based on past experience and on the preliminary information provided by the customer.

11. The method of claim 10 wherein the customer's approval of the project for further analysis is based on the estimate of the likely duration of the project.

12. The method of claim 9 wherein the confirming of the reserved resources comprises determining whether the results of the further analysis indicate whether modifications are needed in the reserved resources.

13. The method of claim 12 wherein, if it is determined that modifications are needed in the reserved resources, alerts are sent to projects dependent on a project for which modifications are needed in the reserved resources, the alerts informing the dependent projects that further analysis may be needed.

14. The method of claim 9 wherein the further analysis comprises a functional requirements modeling step, a system requirements modeling step, an application integration modeling step, and a contract development step.

15. A computer implemented method for scheduling resources to be used in a software development project comprising:
a customer submitting information about the software development project to an Information Technology department, wherein the software development project is completed through define, discover, design, develop and deploy phases, and wherein the software development project one of a plurality of software development projects bundled in a release, wherein the release has a predefined resource capacity;
the Information Technology department analyzing the feasibility of the project and estimating its cost in the define phase;
the customer deciding whether to proceed to the discover phase with the project based on the analysis of feasibility and estimate of cost, wherein the discover phase is in support of business requirements which are documented in a centralized repository and enable traceability and reuse in subsequent projects;
upon deciding to proceed to the discover phase, the customer prioritizing and funding the project and the Information Technology department reserving resources for the software development project from the redefined resource capacity for the release, wherein the reserving of resources is aided by a software tool that uses past experience and the information submitted by the customer as input and produces an estimate of the resources required as output, wherein reserving resources reduces availability of the predefined resource capacity in the release for subsequent projects;
the Information Technology department modeling in the discover phase at least one requirement for the project after deciding to proceed to the discover phase, wherein modeling the at least one requirement includes one or more of function requirements modeling, system requirements modeling, and application integration modeling;
upon completion of the at least one requirement modeling, the Information Technology department giving the customer a final contract with an estimate of resources needed for completion of the project; and
booking the reserved resources as agreed on in the final contract upon approval of the final contract with the estimate by the customer; and
the planning department storing a list of the reserved resources on a computer readable medium.

16. The method of claim 15 further comprising, during the requirement modeling, the Information Technology department determining whether the results of the modeling of a requirement indicate that modifications to the requirement are needed.

17. The method of claim 16 wherein, when modifications are needed, alerts are sent to projects dependent on a project for which modifications are needed in the reserved resources, the alerts informing the dependent projects that further analysis may be needed.

18. A computer implemented method for scheduling software releases for a computer system comprising:

planning a series of releases for a given time period through define, discover, design, develop, and deploy phases, wherein each release has an initial allocation of resource capacity;

reviewing information regarding proposed software projects and providing initial estimates of cost and duration for such projects to customers in the define phase for approval to move into a detailed analysis in the discover phase, wherein the discover phase is in support of business requirements which are documented in a centralized repository and enable traceability and reuse in subsequent projects;

on receiving approval for the detailed analysis for each project, reviewing the planned series of releases and the initial estimate of cost and duration for the approved project and reserving capacity for the approved project in a release having sufficient available resource capacity in the initial allocation of capacity of the release, wherein the reserving of capacity for the approved project is aided by a software tool that uses past experience and the information regarding the approved project as input and produces an estimate of the resources required as output; and, wherein reserving capacity reduces availability of the initial allocation of resource capacity of the release for subsequent projects, and wherein the detailed analysis includes one or more of functional requirements modeling, system requirements modeling, and application integration modeling;

adjusting the reserved capacity as the detailed analysis and as customer feedback change the scope of the projects approved for the detailed analysis and, where available capacity is not present, moving the reserved capacity to a later release;

as the detailed analysis of the approved projects are completed and the approved projects are finally approved for development through a contract, booking the reserved capacity in the releases; and the planning department storing a list of the reserved capacity on a computer readable medium.

19. The method of claim 18, wherein reviewing the planned series of releases and the initial estimate of cost and duration for the approved project further comprises:

reviewing the preliminary test approach as determined in the initial review, the type of lab required, and the available capacity in the required lab.

20. The method of claim 18, wherein reviewing the planned series of releases and the initial estimate of cost and duration for the approved project further comprises:

reviewing dependencies with other projects.

21. The method of claim 18, wherein reviewing the planned series of releases and the initial estimate of cost and duration for the approved project further comprises:

reviewing the available workforce in the required areas.

22. The method of claim 18, further comprising prior to planning a series of releases for a given time period:

receiving from customers estimates of total time required for proposed projects in the given time period; and, adding the received estimates to get a total amount of time for the given time period and dividing the time into releases throughout the time period.

23. The method of claim 22, wherein the number and capacity of the planned releases is determined by the total amount of time received.

24. The method of claim 22, wherein an extra percentage of time is added to the capacity allocated to each release.

* * * * *